United States Patent Office 3,359,330
Patented Dec. 19, 1967

3,359,330
3,5,X POLYALKOXY α,ω DIOLS
Samuel A. Glickman, Easton, Pa., assignor to General Aniline & Film Corporation, New York, N.Y., a corporation of Delaware
No Drawing. Filed Nov. 20, 1961, Ser. No. 153,689
3 Claims. (Cl. 260—615)

This application is a continuation-in-part of my copending application Ser. No. 588,991 filed June 4, 1956 and now abandoned.

This invention relates to a new series of essentially straight chain polyalkoxydiols in which the hydroxyl groups are at the ends of a straight carbon chain having an odd number of carbons and in which the intermediate odd numbered carbon atoms have an alkoxy substituent. These novel products may be represented by the following general formula:

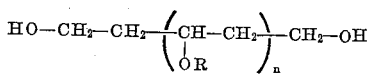

wherein $n$ represents an integer from of at least 2 and preferably 4 to 50. These compounds are hereinafter referred to as 3,5,X polyalkoxy alkyl-α-ω-diols. These novel compounds are readily prepared by subjection to simultaneous hydrolysis and reduction diacetals of α-ω-dicarbonilic-3,5,X alkoxy compounds of the following general formula:

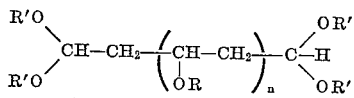

wherein $n$ is an integer of at least 2 and preferably 4 to 50, and R and R′ are alkyl groups of from 1 to 8 carbon atoms. Such 3,5,X-polyalkoxy-α-ω-diacetals are readily prepared by reaction of malonaldehyde diacetal with an alkyl vinyl ether as described in U.S. Patent No. 2,502,433. The value of $n$ in the above formulas being an average value corresponding to the number of moles of vinyl ether reacted with the malonaldehyde diacetal in the manner described in said U.S. Patent 2,502,433 so that the products of the present invention are mixtures of compounds of the formula given.

A general method for the preparation of the novel compounds of the present invention comprises subjecting the 3,5,X polyalkoxy-α-ω-acetals to simultaneous conditions of hydrolysis and hydrogenation; in an aqueous medium and in the presence of catalytic amounts, preferably in the order of 1 mole percent and less of hydrolyzable metal salts of zinc and nickel as a hydrolysis catalyst, while maintaining the pH of the reaction mixture, preferably within a range of 4.5 to 5.5 and under hydrogen at a pressure on the order of 600 to 2000 p.s.i. and at moderate temperatures, preferably in the range of 75 to 180° C. in the presence of a hydrogenation catalyst, e.g. Raney nickel. In this manner the terminal acetal groups of the 3,5,X,-α-ω-diacetals are converted to terminal hydroxyl groups and the novel 3,5,X,α,ω diols of the present invention formed possibly through hydrolysis of the acetal group to aldehyde groups and the reduction of the thus formed aldehyde groups to the alcohol groups substantially as quickly as they are formed. However, the precise mechanism of the reaction has not been definitely established.

As stated various hydrolyzable metal salts of zinc and nickel are particularly useful as hydrolysis catalysts but the salts of manganese, copper, cobalt and iron may also be used. It is particularly preferred to employ the nickel salts since these perform very well and it is possible to add the desired acid to the Raney nickel slurry and obtain the salt in this manner. The use of toluene sulfonic, pseudocumene sulfonic, methane sulfonic, sulfuric, hydrochloric, and trichloroacetic acids as sources of anions for the hydrolyzable salts have been shown to be of value. These hydrolyzable metal salts of strong mineral and organic acids are used as hydrolytic agents in the present invention in catalytic amounts preferably of one mole percent and less. Such small amounts facilitate markedly the working up of the products since the concentration of metal salts are at a minimum, however, larger amounts are operative.

The reaction is preferably carried out at a pH within the range of 4.5 to 5.5 and, under these conditions, the corroding action on the equipment is at a minimum so that less expensive equipment may be used. In addition catalytic amounts of hydrolyzable metal salts are used as hydrolytic agents in the process of the present invention in place of significant quantities of aqueous mineral acids which have heretofore commonly been used in the hydrolysis of acetals to aldehydes.

It has been found that the use of hydrogen pressures of the order from 600 to 2000 pounds per square inch and temperatures within the range of 75 to 180° C. are to be preferred in practicing the present process. The uptake of hydrogen under these conditions has been satisfactorily rapid and it will be apparent that these conditions make it possible to use ordinary equipment and eliminate the need for extremely high pressure apparatus.

Example 1

1000 parts by weight of the reaction product of methyl orthoformate with four moles of vinyl methyl ether, prepared according to U.S. Patent 2,502,433, and corresponding to a mixture of polymethoxy alkanedialdehyde, tetra methyl diacetals of the average formula:

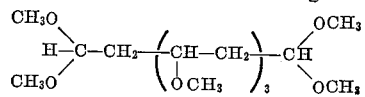

300 parts of water, 30 parts of Raney nickel (calculated on a dry basis) and 12 parts of nickel p-toluene sulfonate were subjected to simultaneous hydrolysis-reduction in a stainless steel hydrogenation vessel of the Adkins rocking bomb type at a temperature of 75–80° C. and under a hydrogen pressure of 1000 p.s.i.g. The reaction mixture was cooled and filtered free of Raney nickel. Removal of the water and methanol at reduced pressure, followed by removal by filtration of deposited nickel salts yielded a viscous, water-soluble oily liquid having the average formula:

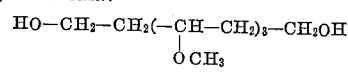

on completion of hydrogenation in 3 to 4 hours.

Example 2

The procedure of Example 1 was followed except that 1,1,3-triethoxy-5,7,7-trimethoxyheptane (disclosed in part 3 of Example 2 of U.S.P. 2,527,533) was used in place of the 1,1,3,5,7,9,9-heptamethoxy nonane, thereby yielding 3-methoxy-5-ethoxy-heptane-diol-1,7.

Example 3

A mixture of 1072 parts by weight of a 3,5,X polymethoxy α,α,ω,ω-tetra ethyl diacetal prepared having the formula

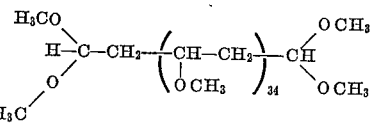

and prepared in the manner described in U.S. Patent 2,502,433 by reaction of 1 molar proportion of malondialdehyde tetra methyl diacetal with 34 molar proportions of methyl vinyl ether was added to 110 parts by weight of water, 200 parts of methanol, 20 parts of Raney nickel (calculated on a dry basis) and 4 parts of p-toluene sulfonic acid were subjected to simultaneous hydrolysis and hydrogenation in a stainless steel hydrogenation vessel of the Adkins rocking bomb type autoclave. The contents of the autoclave was maintained at a temperature of 100 to 110° C. and subjected to the reaction of hydrogen at 1500 p.s.i.g. for a period of about 6 hours, at which time the hydrogenation was essentially complete. The contents of the autoclave was then cooled and the pressure released and its contents filtered free of Raney nickel. The resultant solution was ion exchanged, to remove nickel salts, by passage through a polynuclear sulfonic ion exchange resin (Amberlite IR-120, Rohm & Haas Corp.) and a weakly basic ion exchange resin (Amebrlite IR-45, Rohm & Haas Corp.). The effluent was concentrated at reduced pressure to remove water and methanol. There is obtained 980 parts of the polymethoxy-α,ω-diol of the average formula

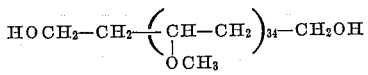

The yield was essentially quantitative. It was a viscous, almost colorless, mobile liquid, soluble in cold water, acetone, lower alcohols, toluene and benzene. Molecular weight by benzene depression was 2075.

*Exampe 4*

The reaction product of ethyl ortho formate with 10 moles of vinyl-2-ethylhexyl ether prepared according to U.S. Patent 2,502,433 was subjected to simultaneous hydroylsis reduction as in Example 3. The product an α,ω diol having an average chain length of 21 carbon atoms with alkoxy groups (largely 2 ethylhexyloxy groups, but with some ethoxy groups on the intermediate odd numbered carbons) was a viscous, water insoluble, oily liquid. Molecular weight by freezing point depression in benzene was about 1450.

The products of the present invention have been found to be of value in the manufacture of polyurethanes by reaction with polyisocyanates and the products of high molecular weight, i.e., those in which n is 15 or more and in which the alkoxy groups are methyl or ethyl have been found to be of sufficient molecular weight so that on direct reaction with isocyanate a polyurethane of good flexibility and other desirable properties is obtained. It will be appreciated that the polyurethanes obtained by direct reaction of the novel diol of this invention with polyisocyanates (e.g., 2,4 or 2,6-tolylenediisocyanate or mixtures thereof or other isocyanate) being free of ester groups are more resistant to alkaline hydrolysis and oxidation than the polyurethanes obtained from polyesters of diols. For the lower molecular weight products, i.e. those in which an alkoxy group on the odd numbered carbon atoms are methyl and ethyl and in which n is 15 or lower or particularly 10 or lower when reacted with an isocyanate directly give a polyurethane of greater rigidity. However, polyesters formed therefrom by reaction with di- and polybasic acids, such as adipic, sebacic, phthalic, etc., are however of sufficient molecular weight that when these polyesters are reacted with polyisocyanates such as 2,4-toluenediisocyanate, 2,6-toluenediisocyanate and mixtures thereof, and other disocyanates, polyurethanes are obtained having good flexibility and other desirable properties and useful as foams, films and the like and in the field of adhesives. The polyesters from adipic acid have been found to possess interesting plasticizing properties for various resins, such as polyvinyl chloride, cellulose acetate, cellulose butyrate and similar materials. The polyesters present a very low order of volatility, excellent resistance to water and oil extraction and in addition improve milling behavior, ease of compounding and desirable low temperature flexing properties. It will also be appreciated that depending on the value of n that the ratio of carbon atoms to carbonyl groups in the polyesters can be varied over a wide range. As is known in the polyester art, high carbon to carbonyl ratios improve physical and chemical stability in the polyesters and also in polyurethanes derived therefrom. Therefore it is thus apparent that the novel α,ω diols of the present invention may be custom made to provide any one of a wide range of carbon to carbonyl ratios, in polyesters derived therefrom. Advantage can also be taken of products such as those illustrated by Example 4 above in which some of the alkoxy groups are higher molecular weight alkoxy groups to give α,ω diols in which n is a low number, i.e. an average of 10 or lower, but which nevertheless have sufficiently high molecular weight so that on reaction with polyisocyanate they give polyurethanes of good flexibility and other desirable properties.

The compounds of the present invention in which the alkoxy groups are methoxy over the entire range of from 2 to 50 have been found to be water-soluble. They are of value as humectants. The polymethoxy diols of the present invention are applicable as plasticizers for gelatin in various photographic applications. The softening effect noted with casein and other protein-type materials is also of interest. The higher members of the series of the methoxy substituted compounds, i.e. those compounds in which n is 15 or higher, have been found to be of value as viscosity index improvers in water based hydraulic fluids. They are also of interest as heat sensitive latex coagulants having quite similar properties in this respect to polymethoxy acetals disclosed in U.S. Patent 2,842,606. They are also useful in the preparation of emulsions since they are soluble in both polar and non-polar solvents.

I claim:
1. Mixtures of the group consisting of alkoxy substituted α,ω primary diols of the formula

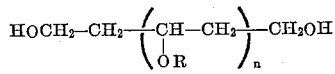

wherein R is an alkyl radical of from 1 to 8 carbon atoms, and n is an integer having an average value of from 2 to 50.

2. Mixtures of the group consisting of alkoxy substituted α,ω primary diols of the formula

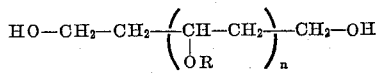

where R is an alkyl radical having 1 to 2 carbon atoms and n has an average value from 10 to 50.

3. The compositions of claim 2 where R is methyl.

References Cited
UNITED STATES PATENTS

| | | | |
|---|---|---|---|
| 2,502,433 | 4/1950 | Copenhaver | 260—615 |
| 2,600,275 | 6/1952 | Smith | 260—615 |
| 2,618,663 | 11/1952 | Glickman | 260—615 |
| 2,704,771 | 3/1955 | Smith | 260—615 |
| 2,931,837 | 4/1960 | Stansbury et al. | 260—615 |

BERNARD HELFIN, *Primary Examiner.*
CHARLES B. PARKER, LEON ZITVER, *Examiners.*
D. D. HORWITZ, *Assistant Examiner.*